(12) United States Patent
Konishi et al.

(10) Patent No.: US 12,123,739 B2
(45) Date of Patent: Oct. 22, 2024

(54) MAP GENERATION APPARATUS

(71) Applicant: Honda Motor Co., Ltd., Tokyo (JP)

(72) Inventors: Yuichi Konishi, Wako (JP); Naoki Mori, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 168 days.

(21) Appl. No.: 17/676,585

(22) Filed: Feb. 21, 2022

(65) Prior Publication Data

US 2022/0291014 A1 Sep. 15, 2022

(30) Foreign Application Priority Data

Mar. 9, 2021 (JP) ................................ 2021-037061

(51) Int. Cl.
*G01C 21/00* (2006.01)
*G01C 21/36* (2006.01)

(52) U.S. Cl.
CPC ...... *G01C 21/3811* (2020.08); *G01C 21/3602* (2013.01); *G01C 21/3837* (2020.08); *G01C 21/387* (2020.08)

(58) Field of Classification Search
None
See application file for complete search history.

(56) References Cited

U.S. PATENT DOCUMENTS

2016/0238394 A1* 8/2016 Iimura ...................... G06T 7/20
2021/0003420 A1* 1/2021 Hamperl ............ G01C 21/3602

FOREIGN PATENT DOCUMENTS

| CN | 112446915 A | 3/2021 |
| JP | 2013537995 A | 10/2013 |
| WO | 2015049717 A1 | 4/2015 |
| WO | 2019082670 A1 | 5/2019 |

OTHER PUBLICATIONS

Japanese office action; Application 2021-037061; Dec. 20, 2022.

* cited by examiner

*Primary Examiner* — Hongye Liang
(74) *Attorney, Agent, or Firm* — Duft & Bornsen, PC

(57) ABSTRACT

A map generation apparatus includes: an in-vehicle detection unit configured to detect a situation around a subject vehicle in traveling; and a microprocessor and a memory connected to the microprocessor. The microprocessor is configured to perform: extracting one or more feature points from a detection data acquired by the in-vehicle detection unit; generating a map using the feature points extracted in the extracting while the subject vehicle is traveling; collating the feature points extracted in the extracting with the map to recognize a position of the subject vehicle on the map when the subject vehicle travels in a region corresponding to the map; and deleting, from the map, a feature point whose result of collation in the recognizing is less than a predetermined degree among the feature points included in the map.

12 Claims, 5 Drawing Sheets

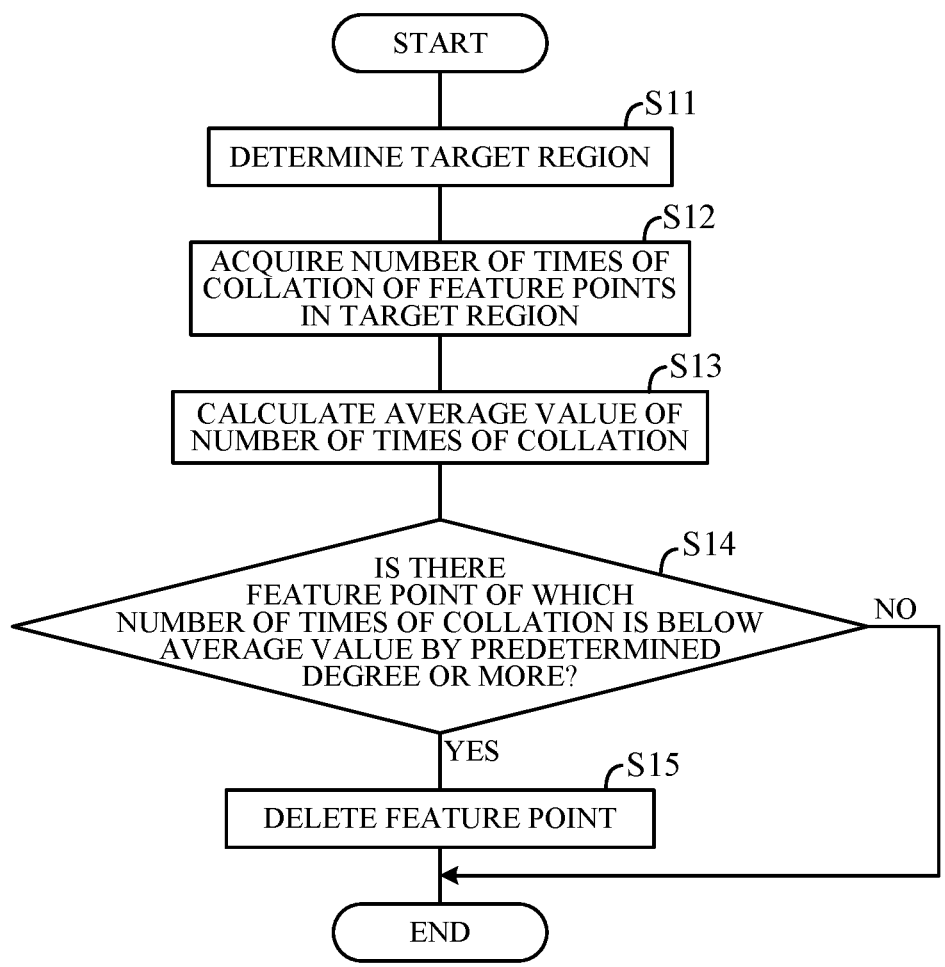

MAP GENERATION APPARATUS

CROSS-REFERENCE TO RELATED APPLICATION

This application is based upon and claims the benefit of priority from Japanese Patent Application No. 2021-037061 filed on Mar. 9, 2021, the content of which are incorporated herein by reference.

BACKGROUND OF THE INVENTION

Field of the Invention

This invention relates to a map generation apparatus configured to generate a map used for acquiring a position of a vehicle.

Description of the Related Art

As this type of device, there has been conventionally known a device that extracts a feature point from a captured image of an in-vehicle camera, generates a map including the feature point, and acquires a position of a subject vehicle based on a displacement amount of the feature point obtained by tracking the extracted feature point (see, for example, WO 2015/049717 A1). In the device described in WO 2015/049717 A1, when the feature point being tracked is not extracted from the current captured image, the feature point is excluded from the tracking target.

The feature points included in the map may include unnecessary feature points that do not match the current road environment due to a change in road structure or the like. Therefore, there is a possibility that unnecessary feature points cannot be sufficiently reduced only by excluding a feature point that cannot be tracked as in the device described in WO 2015/049717 A1.

SUMMARY OF THE INVENTION

An aspect of the present invention is a map generation apparatus including: an in-vehicle detection unit configured to detect a situation around a subject vehicle in traveling; and a microprocessor and a memory connected to the microprocessor. The microprocessor is configured to perform: extracting one or more feature points from a detection data acquired by the in-vehicle detection unit; generating a map using the feature points extracted in the extracting while the subject vehicle is traveling; collating the feature points extracted in the extracting with the map to recognize a position of the subject vehicle on the map when the subject vehicle travels in a region corresponding to the map; and deleting, from the map, a feature point whose result of collation in the recognizing is less than a predetermined degree among the feature points included in the map.

BRIEF DESCRIPTION OF THE DRAWINGS

The objects, features, and advantages of the present invention will become clearer from the following description of embodiments in relation to the attached drawings, in which:

FIG. 4 is a flowchart illustrating an example of processing executed by the controller in FIG. 2.

DETAILED DESCRIPTION OF THE INVENTION

An embodiment of the present invention will be described below with reference to FIGS. 1 to 4. A map generation apparatus according to the embodiment of the present invention can be applied to a vehicle including a self-driving capability, that is, a self-driving vehicle. It is to be noted that a vehicle to which the map generation apparatus according to the present embodiment is applied may be referred to as a subject vehicle as distinguished from other vehicles. The subject vehicle may be any of an engine vehicle including an internal combustion (engine) as a traveling drive source, an electric vehicle including a traveling motor as a traveling drive source, and a hybrid vehicle including an engine and a traveling motor as a traveling drive source. The subject vehicle can travel not only in a self-drive mode in which driving operation by a driver is unnecessary, but also in a manual drive mode with driving operation by the driver.

Figure 1:
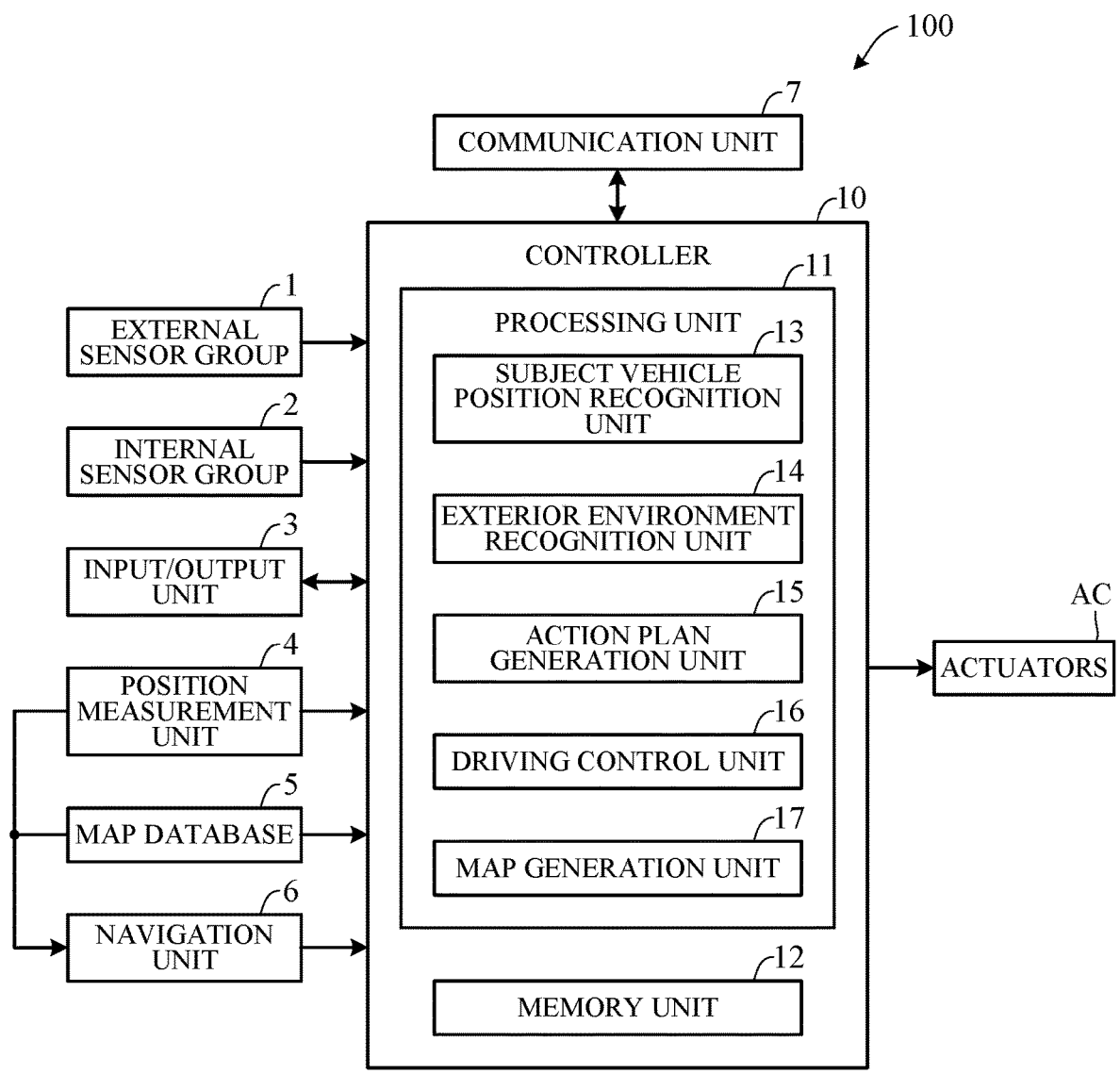
FIG. 1 is a block diagram schematically illustrating an overall configuration of a vehicle control system according to an embodiment of the present invention.

First, a schematic configuration related to self-driving will be described. FIG. 1 is a block diagram schematically illustrating an overall configuration of a vehicle control system 100 including a map generation apparatus according to the embodiment of the present invention. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and traveling actuators AC each communicably connected to the controller 10.

The external sensor group 1 is a generic term for a plurality of sensors (external sensors) that detect an external situation which is peripheral information of the subject vehicle. For example, the external sensor group 1 includes a LiDAR that measures scattered light with respect to irradiation light in all directions of the subject vehicle and measures a distance from the subject vehicle to surrounding obstacles, a radar that detects other vehicles, obstacles, and the like around the subject vehicle by irradiating with electromagnetic waves and detecting reflected waves, and a camera that is mounted on the subject vehicle, has an imaging element such as a charge coupled device (CCD) or a complementary metal oxide semiconductor (CMOS), and images a periphery (forward, backward, and sideward) of the subject vehicle.

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects an acceleration in a front-rear direction of the subject vehicle and an acceleration in a left-right direction (lateral acceleration) of the subject vehicle, a revolution sensor that detects the number of revolution of the traveling drive source, and a yaw rate sensor that detects a rotation angular speed around a vertical axis of the center of gravity of the subject vehicle. The internal sensor group 2 further includes a sensor that detects driver's driving operation in a manual drive mode, for example, operation of an accelerator pedal, operation of a brake pedal, operation of a steering wheel, and the like.

The input/output device 3 is a generic term for devices in which a command is input from a driver or information is output to the driver. For example, the input/output device 3 includes various switches to which the driver inputs various commands by operating an operation member, a microphone to which the driver inputs a command by voice, a display that provides information to the driver via a display image, and a speaker that provides information to the driver by voice.

The position measurement unit (global navigation satellite system (GNSS) unit) 4 includes a positioning sensor that receives a signal for positioning, transmitted from a positioning satellite. The positioning satellite is an artificial satellite such as a global positioning system (GPS) satellite or a quasi-zenith satellite. The position measurement unit 4 uses positioning information received by the positioning sensor to measure a current position (latitude, longitude, and altitude) of the subject vehicle.

The map database 5 is a device that stores general map information used for the navigation unit 6, and is constituted of, for example, a hard disk or a semiconductor element. The map information includes road position information, information on a road shape (curvature or the like), position information on intersections and branch points, and information on a speed limit set for a road. The map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated based on a current position of the subject vehicle measured by the position measurement unit 4 and the map information stored in the map database 5. The current position of the subject vehicle can be measured using the detection values of the external sensor group 1, and the target route may be calculated on the basis of the current position and the highly accurate map information stored in the memory unit 12.

The communication unit 7 communicates with various servers not illustrated via a network including wireless communication networks represented by the Internet, a mobile telephone network, and the like, and acquires the map information, traveling history information, traffic information, and the like from the servers periodically or at an arbitrary timing. The network includes not only public wireless communication networks, but also a closed communication network provided for every predetermined management area, for example, a wireless local area network (LAN), Wi-Fi (registered trademark), Bluetooth (registered trademark), and the like. The acquired map information is output to the map database 5 and the memory unit 12, and the map information is updated.

The actuators AC are traveling actuators for controlling traveling of the subject vehicle. In a case where the traveling drive source is an engine, the actuators AC include a throttle actuator that adjusts an opening (throttle opening) of a throttle valve of the engine. In a case where the traveling drive source is a traveling motor, the traveling motor is included in the actuators AC. The actuators AC also include a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), the memory unit 12 such as a ROM and a RAM, and other peripheral circuits (not illustrated) such as an I/O interface. Although a plurality of ECUs having different functions such as an engine control ECU, a traveling motor control ECU, and a braking device ECU can be separately provided, in FIG. 1, the controller 10 is illustrated as a set of these ECUs for convenience.

The memory unit 12 stores highly accurate detailed map information (referred to as highly accurate map information). The highly accurate map information includes road position information, information of a road shape (curvature or the like), information of a road gradient, position information of an intersection or a branch point, information of the number of lanes, width of a lane and position information for each lane (information of a center position of a lane or a boundary line of a lane position), position information of a landmark (traffic lights, signs, buildings, etc.) as a mark on a map, and information of a road surface profile such as unevenness of a road surface. The highly accurate map information stored in the memory unit 12 includes map information acquired from the outside of the subject vehicle via the communication unit 7, for example, information of a map (referred to as a cloud map) acquired via a cloud server, and information of a map created by the subject vehicle itself using detection values by the external sensor group 1, for example, information of a map (referred to as an environmental map) including point cloud data generated by mapping using a technology such as simultaneous localization and mapping (SLAM). The memory unit 12 also stores information on various control programs and thresholds used in the programs.

The processing unit 11 includes a subject vehicle position recognition unit 13, an exterior environment recognition unit 14, an action plan generation unit 15, a driving control unit 16, and a map generation unit 17 as functional configurations.

The subject vehicle position recognition unit 13 recognizes the position (subject vehicle position) of the subject vehicle on a map, based on the position information of the subject vehicle, obtained by the position measurement unit 4, and the map information of the map database 5. The subject vehicle position may be recognized using the map information stored in the memory unit 12 and the peripheral information of the subject vehicle detected by the external sensor group 1, whereby the subject vehicle position can be recognized with high accuracy. When the subject vehicle position can be measured by a sensor installed on a road or outside a road side, the subject vehicle position can be recognized by communicating with the sensor via the communication unit 7.

The exterior environment recognition unit 14 recognizes an external situation around the subject vehicle, based on the signal from the external sensor group 1 such as a LiDAR, a radar, and a camera. For example, the position, travelling speed, and acceleration of a surrounding vehicle (a forward vehicle or a rearward vehicle) traveling around the subject vehicle, the position of a surrounding vehicle stopped or parked around the subject vehicle, and the positions and states of other objects are recognized. Other objects include signs, traffic lights, markings (road surface markings) such as division lines and stop lines of roads, buildings, guardrails, utility poles, signboards, pedestrians, and bicycles. The states of other objects include a color of a traffic light (red, green, yellow), and the moving speed and direction of a pedestrian or a bicycle. A part of the stationary object among the other objects constitutes a landmark serving as an index of the position on the map, and the exterior environment recognition unit 14 also recognizes the position and type of the landmark.

The action plan generation unit 15 generates a driving path (target path) of the subject vehicle from a current point of time to a predetermined time ahead based on, for example, the target route calculated by the navigation unit 6, the subject vehicle position recognized by the subject vehicle position recognition unit 13, and the external situation recognized by the exterior environment recognition unit 14. When there are a plurality of paths that are candidates for the target path on the target route, the action plan generation unit 15 selects, from among the plurality of paths, an optimal path that satisfies criteria such as compliance with laws and regulations, and efficient and safe traveling, and sets the selected path as the target path. Then, the action plan generation unit 15 generates an action plan corresponding to the generated target path. The action plan generation unit 15 generates various action plans corresponding to traveling modes, such as overtaking traveling for overtaking a preceding vehicle, lane change traveling for changing a traveling lane, following traveling for following a preceding vehicle, lane keeping traveling for keeping the lane so as not to deviate from the travel lane, deceleration traveling, or acceleration traveling. When the action plan generation unit 15 generates the target path, the action plan generation unit 15 first determines a travel mode, and generates the target path based on the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining the target acceleration for each unit time calculated by the action plan generation unit 15 in consideration of travel resistance determined by a road gradient or the like in the self-drive mode. Then, for example, the actuators AC are feedback controlled so that an actual acceleration detected by the internal sensor group 2 becomes the target acceleration. More specifically, the actuators AC are controlled so that the subject vehicle travels at the target vehicle speed and the target acceleration. In the manual drive mode, the driving control unit 16 controls each of the actuators AC in accordance with a travel command (steering operation or the like) from the driver, acquired by the internal sensor group 2.

The map generation unit 17 generates an environmental map constituted by three-dimensional point cloud data using detection values detected by the external sensor group 1 during traveling in the manual drive mode. Specifically, an edge indicating an outline of an object is extracted from a captured image acquired by a camera 1a based on luminance and color information for each pixel, and a feature point is extracted using the edge information. The feature point is, for example, an intersection of edges, and corresponds to a corner of a building, a corner of a road sign, or the like. The map generation unit 17 sequentially plots the extracted feature points on the environmental map, thereby generating the environmental map around the road on which the subject vehicle has traveled. The environmental map may be generated by extracting the feature points of an object around the subject vehicle with the use of data acquired by a radar or LiDAR instead of the camera. In addition, when generating the environmental map, the map generation unit 17 determines whether or not a landmark such as a traffic light, a sign, and a building as a mark on the map is included in the captured image acquired by the camera by using, for example, pattern matching processing. When it is determined that the landmark is included, the position and the type of the landmark on the environmental map are recognized based on the captured image. The landmark information is included in the environmental map and stored in the memory unit 12.

The subject vehicle position recognition unit 13 performs subject vehicle position estimation processing in parallel with map creation processing by the map generation unit 17. That is, the position of the subject vehicle is estimated and acquired based on a change in the position of the feature point over time. In addition, the subject vehicle position recognition unit 13 estimates and acquires the subject vehicle position based on a relative positional relationship with a landmark around the subject vehicle. The map creation processing and the position estimation processing are simultaneously performed, for example, according to an algorithm of SLAM. The map generation unit 17 can generate the environmental map not only when the vehicle travels in the manual drive mode but also when the vehicle travels in the self-drive mode. If the environmental map has already been generated and stored in the memory unit 12, the map generation unit 17 may update the environmental map with a newly obtained feature point.

Incidentally, the environmental map including the point cloud data has a large amount of data, and when an environmental map corresponding to a wide region is created, the capacity of the memory unit 12 may be greatly deprived. Therefore, in order to reduce the amount of data of the environmental map, in the present embodiment, the map generation apparatus is s configured as follows.

Figure 2:
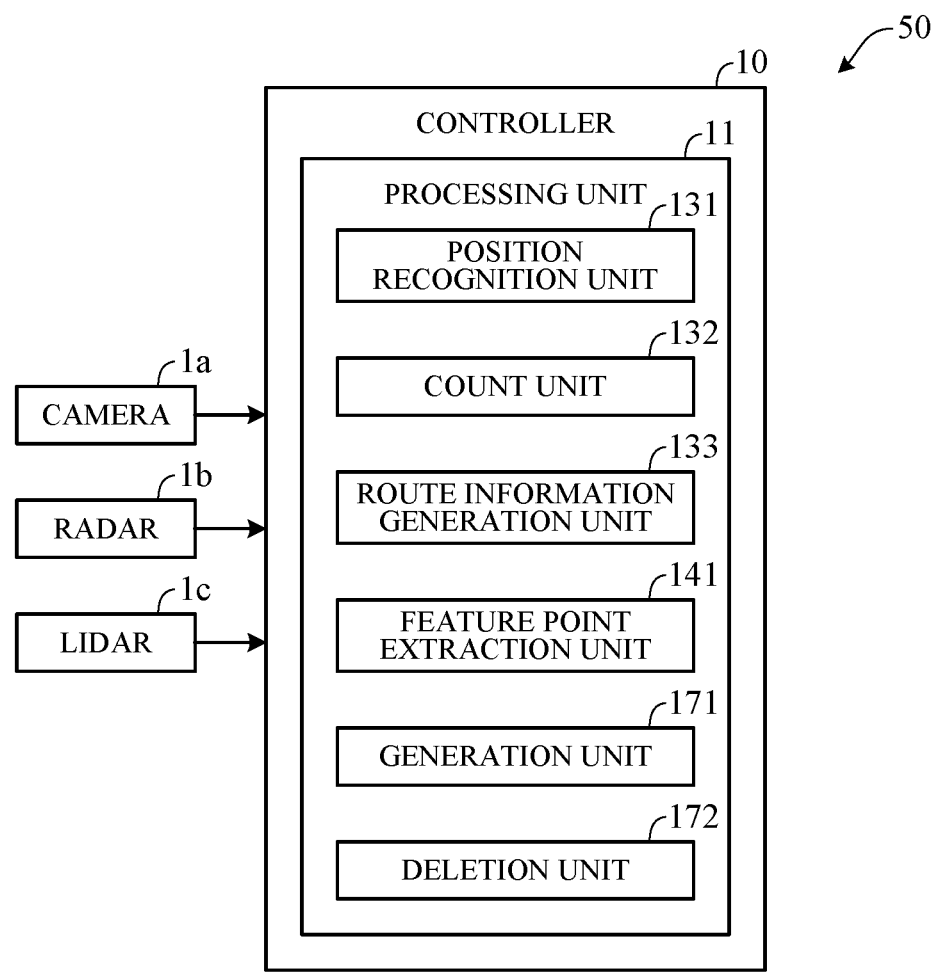
FIG. 2 is a block diagram illustrating a main configuration of the map generation apparatus according to an embodiment of the present invention.

FIG. 2 is a block diagram illustrating a main configuration of the map generation apparatus 50 according to the embodiment of the present invention. The map generation apparatus 50 generates a point cloud map (environmental map) based on feature points extracted from a captured image of the camera 1a, and constitutes a part of the vehicle control system 100 in FIG. 1. As illustrated in FIG. 2, the map generation apparatus 50 includes the controller 10, the camera 1a, a radar 1b, and a LiDAR 1c.

The camera 1a is a monocular camera having an imaging element (image sensor) such as a CCD or a CMOS, and constitutes a part of the external sensor group 1 in FIG. 1. The camera 1a may be a stereo camera. The camera 1a images the surroundings of the subject vehicle. The camera 1a is mounted at a predetermined position, for example, in front of the subject vehicle, and continuously captures an image of a space in front of the subject vehicle to acquire an image data (Hereinafter, it is referred to as captured image data or simply a captured image.) of the object. The camera 1a outputs the captured image to the controller 10. The radar 1b is mounted on the subject vehicle and detects other vehicles, obstacles, and the like around the subject vehicle by irradiating with electromagnetic waves and detecting reflected waves. The radar 1b outputs a detection value (detection data) to the controller 10. The LiDAR 1c is mounted on the subject vehicle, and measures scattered light with respect to irradiation light in all directions of the subject vehicle and detects a distance from the subject vehicle to surrounding vehicles and obstacles. The LiDAR 1c outputs the detection value (detection data) to the controller 10.

The controller 10 includes a position recognition unit 131, a count unit 132, a route information generation unit 133, a feature point extraction unit 141, a generation unit 171, and a deletion unit 172 as functional configurations carried by the processing unit 11 (FIG. 1). The feature point extraction unit 141 includes, for example, the exterior environment recognition unit 14 in FIG. 1.

The feature point extraction unit 141 extracts a feature point from the captured image acquired by the camera 1*a*. The generation unit 171 generates an environmental map using the feature point extracted by the feature point extraction unit 141 while the subject vehicle 101 is traveling.

When the subject vehicle 101 travels in the region where the environmental map is generated by the generation unit 171, the position recognition unit 131 collates the feature point extracted by the feature point extraction unit 141 with the environmental map to recognize the position of the subject vehicle 101 on the environmental map. The count unit 132 counts the number of times (hereinafter, referred to as the number of times of collation) that each feature point included in the environmental map is collated by the position recognition unit 131. The deletion unit 172 deletes a feature point whose collation result is less than a predetermined degree from the environmental map. Based on the position of the subject vehicle 101 obtained by the position recognition unit 131 when the subject vehicle 101 is traveling, the route information generation unit 133 generates information (hereinafter, referred to as route information) indicating the route on which the subject vehicle 101 has traveled on the environmental map, and stores the generated information in the memory unit 12. When the subject vehicle 101 travels in the same section a plurality of times, information indicating the section and the number of times of traveling is recorded in the route information.

Figure 3A:
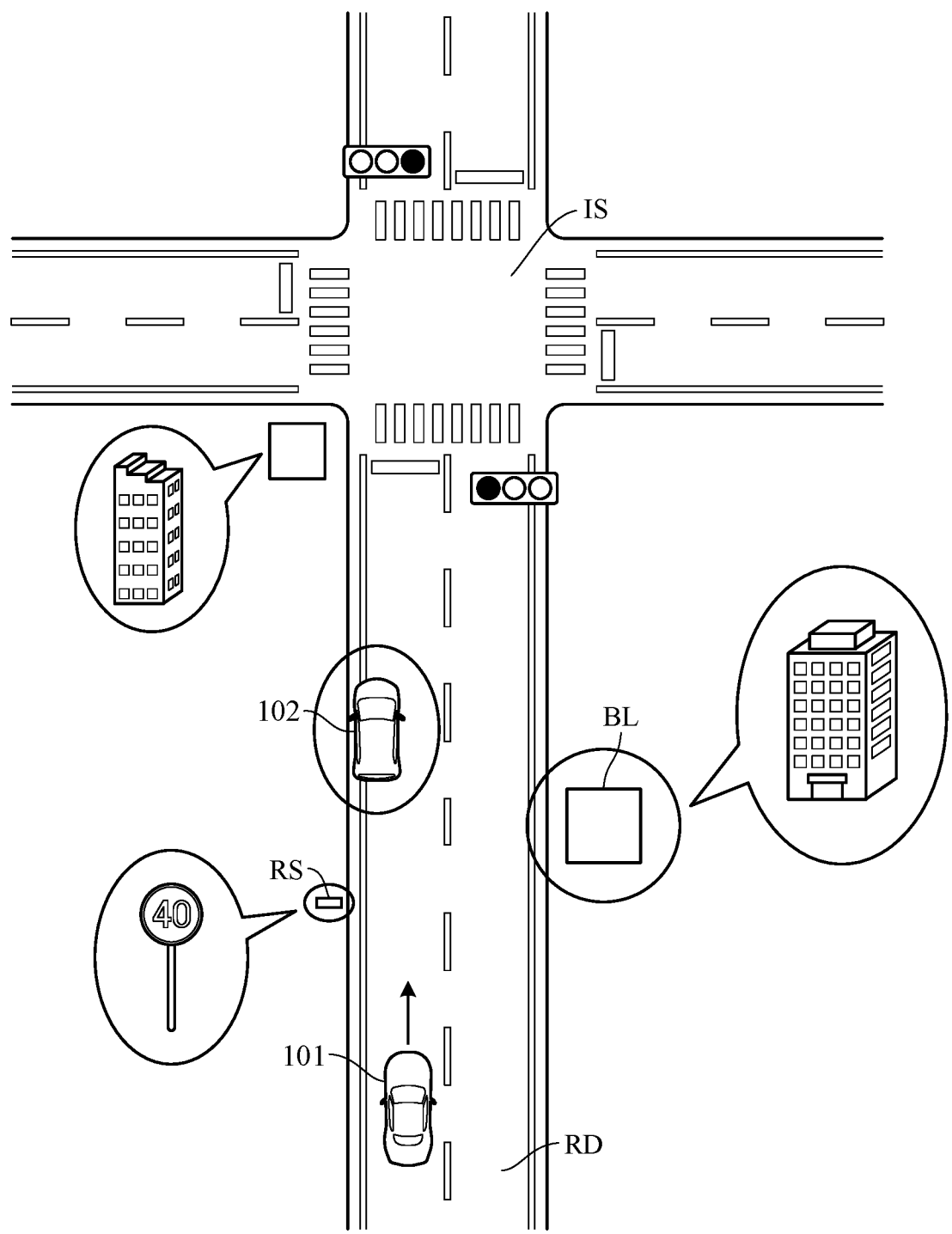
FIG. 3A is a diagram illustrating how a vehicle travels on a road while generating an environmental map.
Figure 3B:
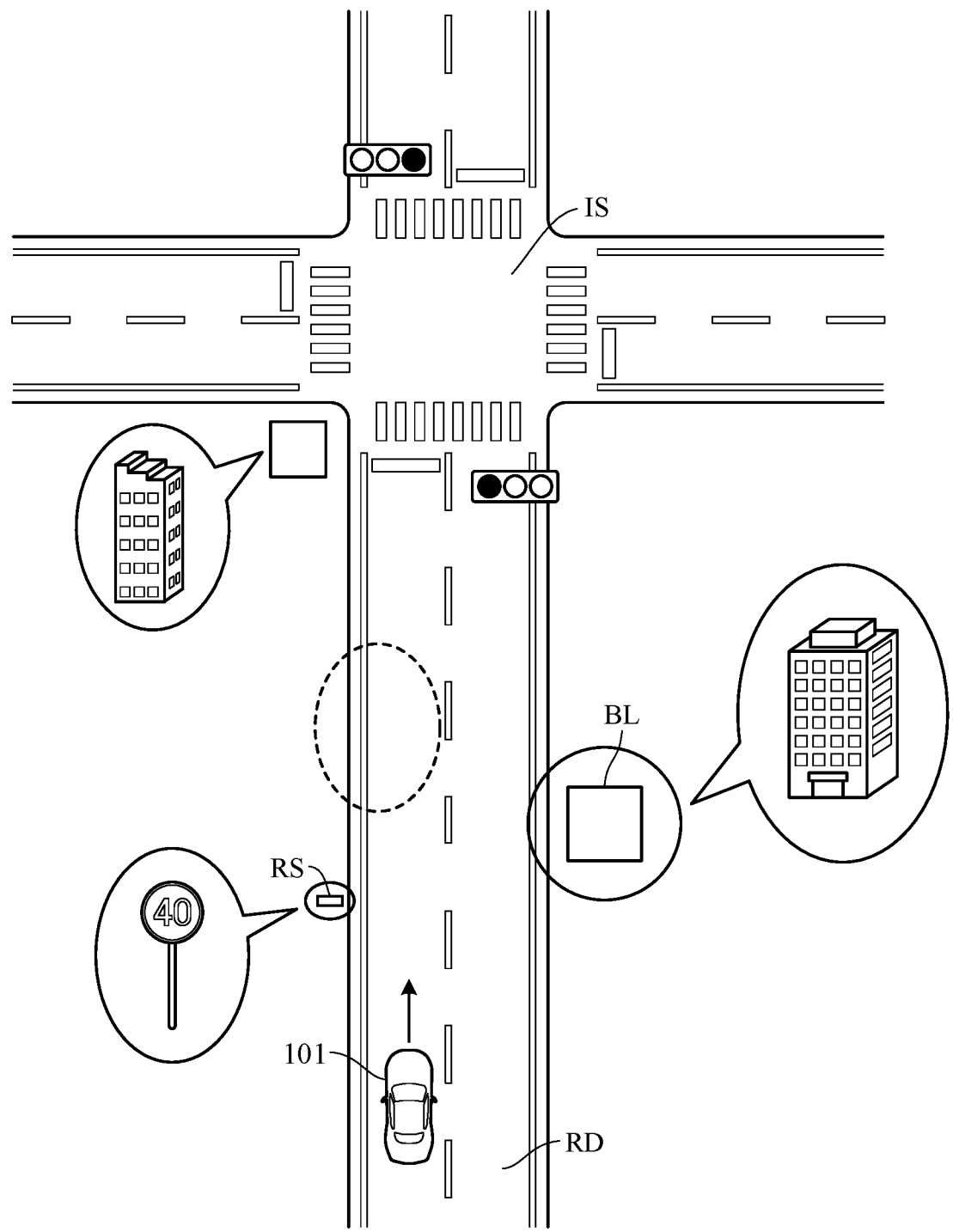
FIG. 3B is a diagram illustrating how a vehicle travels at the point in FIG. 3A in a self-drive mode.

Here, the count unit 132 and the deletion unit 172 will be described. FIG. 3A is a diagram illustrating how a subject vehicle 101 travels on a road while generating the environmental map. In the example illustrated in FIG. 3A, the subject vehicle 101 is traveling toward an intersection IS on a road RD having one lane on one side of left-hand traffic. At the time point illustrated in FIG. 3A, the captured range of the in-vehicle camera (camera 1*a*) of the subject vehicle 101 includes objects such as a building BL, a road sign RS, and a parked vehicle 102. Therefore, feature points of these objects are extracted from the captured image acquired by the camera 1*a*. An object surrounded by a round frame in the drawing represents an object from which a feature point is extracted by the feature point extraction unit 141. Note that, in practice, from the captured image of the camera 1*a*, feature points of other objects on the road or around the road, such as a road mark, a division line of the road, and planting around the road, are also extracted. However, for simplification of description, in the example of FIG. 3A, it is assumed that only the feature points of objects surrounded by the round frame are extracted. The generation unit 171 generates an environmental map using the extracted feature points. When the subject vehicle 101 travels at the point in FIG. 3A in the self-drive mode, the subject vehicle 101 travels while recognizing the subject vehicle position based on the environmental map generated by the generation unit 171. FIG. 3B illustrates a state at that time.

FIG. 3B is a diagram illustrating how the subject vehicle 101 travels at a point in FIG. 3A in the self-drive mode. At the time point of FIG. 3B, the same object is included at the same position as at the time point of FIG. 3A in the captured range of the in-vehicle camera (camera 1*a*) of the subject vehicle 101, and the feature points of these objects are extracted by the feature point extraction unit 141. The position recognition unit 131 collates the feature points of the objects extracted by the feature point extraction unit 141 with the environmental map stored in the memory unit 12 to recognize the position of the subject vehicle 101 on the environmental map. At this time, when the parked vehicle 102 included in the captured range of the camera 1*a* at the time of FIG. 3A is moving and does not exist, the feature point extraction unit 141 does not extract the feature point of the parked vehicle 102. Therefore, the feature point in the environmental map corresponding to the parked vehicle 102 is not referred to by the position recognition unit 131. As described above, the feature point in the environmental map corresponding to a moving object such as a vehicle is not referred to by the position recognition unit 131 when the moving object moves, and becomes unnecessary data. In addition, not only limited to the movement of the moving object, but also if a road structure changes due to road construction, a road sign is installed or removed, or planting on a road side changes according to a season, there is a possibility that the feature point in the environmental map is not referred to.

Therefore, when the feature point collation is performed by the position recognition unit 131, the count unit 132 recognizes the feature point in the environmental map collated with the feature point extracted by the feature point extraction unit 141. Then, the count unit 132 increments the number of times of collation of the recognized feature point by 1. Information (count number information) indicating the number of times of collation of each feature point constituting the environmental map is stored in the memory unit 12, and the count unit 132 updates the count number information each time the feature point is collated by the position recognition unit 131.

The deletion unit 172 determines a region (hereinafter, referred to as a target region) from which feature points are to be deleted from the environmental map. The deletion unit 172 deletes a feature point whose result of collation by the position recognition unit 131 is less than a predetermined degree among feature points included in the target region. Specifically, the deletion unit 172 calculates an average value of the number of times of collation of each feature point included in the target region based on the count number information stored in the memory unit 12, determines a feature point of which the number of times of collation is less than the average value by a predetermined degree or more as unnecessary data, and deletes the data. The target region is a region including a route on which the subject vehicle 101 has traveled a predetermined number of times or more, and is a region of a predetermined size. The deletion unit 172 determines a target region based on the route information stored in the memory unit 12. Specifically, the deletion unit 172 extracts a route on which the subject vehicle 101 has traveled a predetermined number of times or more from the environmental map, determines the size of the region including the extracted route, and determines the region as the target region when the size is the predetermined size or more. Note that the target region may be determined based on an instruction from a user via the input/output device 3. That is, the user may determine the target region. In this way, the amount of data for the environmental map can be reduced. In addition, by deleting unnecessary data in this manner, it is possible to suppress an error in collation of feature points.

FIG. 4 is a flowchart illustrating an example of processing executed by the controller 10 in FIG. 2 according to a predetermined program, particularly an example of processing regarding map generation. The processing illustrated in the flowchart in FIG. 4 is started, for example when the controller 10 is powered on, and is repeated at a predetermined cycle.

First, in S11 (S: processing step), a region from which a feature point is to be deleted, that is, a target region is determined. In S12, the number of times of collation of the feature points in the target region determined in S11 is acquired. In S13, an average value of the number of times of collation of each feature point acquired in S12 is calculated. In S14, it is determined whether or not there is a feature point of which the number of times of collation falls below the average value by a predetermined degree or more in the target region.

If the determination is NO in step S14, the processing ends. If the determination is YES in S14, the feature point deletion processing is performed in S15. Specifically, among the feature points in the target region, the feature point of which the number of times of collation is less than the average value of the number of times of collation calculated in S13 by a predetermined degree or more is deleted. For example, the feature point of which the number of times of collation is equal to or less than a predetermined ratio (x percent) of the average value is deleted. The value of x may be constant, may be determined based on the accuracy required for the environmental map, or may be determined based on the number of times of traveling indicated by the route information, specifically, the number of times of traveling of the subject vehicle 101 in the target region, recorded in the route information. When the feature point deletion processing is performed, the route information is reset. More specifically, the number of times of traveling of the route in the target region is reset to zero. In addition, the count number information is reset. More specifically, the number of times of collation of the feature points in the target region is reset to zero.

According to the embodiment of the present invention, the following advantageous effects can be obtained:

(1) A map generation apparatus 50 includes a camera 1a that detects a situation around a subject vehicle 101 during traveling, a feature point extraction unit 141 that extracts feature points from detection data acquired by the camera 1a, a generation unit 171 that generates a map (environmental map) using the feature points extracted by the feature point extraction unit 141 while the subject vehicle 101 is traveling, a position recognition unit 131 that collates the feature points extracted by the feature point extraction unit 141 with the environmental map to recognize a position of the subject vehicle 101 on the environmental map when the subject vehicle 101 travels in a region corresponding to the environmental map generated by the generation unit 171, and a deletion unit 172 that deletes, from the environmental map, feature points whose results of collation by the position recognition unit 131 are less than a predetermined degree among the feature points included in the environmental map. As a result, unnecessary feature points that are no longer referred to when the subject vehicle position is recognized can be deleted from the map, and the amount of map data can be reduced.

(2) The deletion unit 172 sets, as a target region, a region including a route that is the route on which the subject vehicle 101 has traveled a predetermined number of times or more and has a predetermined length or more, and deletes, from the environmental map, a feature point whose result of collation by the position recognition unit 131 is less than a predetermined degree among feature points extracted by the feature point extraction unit 141 while the subject vehicle 101 is traveling in the target region. As a result, unnecessary data can be deleted from the map without deteriorating the accuracy of the map.

(3) The count unit 132 counts the number of times of collation by the position recognition unit 131 of each feature point included in the environmental map as a result of collation by the position recognition unit 131. The deletion unit 172 calculates an average value of the number of times of collation of each feature point counted by the count unit 132, and deletes a feature point of which the number of times of collation is less than the average value by a predetermined degree or more from the environmental map. As a result, it is possible to more accurately determine whether each feature point included in the target region is unnecessary data.

The above-described embodiment can be modified into various forms. Hereinafter, modified examples will be described. According to the embodiment mentioned above, the camera 1a is configured to detect the situation around the subject vehicle 101, however, the configuration of the in-vehicle detection unit is not limited to the above-described configuration as long as the situation around the subject vehicle 101 is detected. For example, the in-vehicle detection unit may be the radar 1b or the LiDAR 1c. In the above embodiment, the processing illustrated in FIG. 4 is started when the controller 10 is powered on. However, the processing illustrated in FIG. 4 may be executed in response to an instruction from the user.

In the above embodiment, the route information indicating the route on which the subject vehicle 101 has traveled on the environmental map is generated based on the position of the subject vehicle 101 obtained by the position recognition unit 131 when the subject vehicle 101 is traveling. However, the configuration of the route information generation unit is not limited thereto. The route information generation unit may generate a route information based on the map information stored in the map database 5 and the subject vehicle position recognized by the subject vehicle position recognition unit 13. In the above-described embodiment, among the feature points in the target region, the feature point of which the number of times of collation is less than the average value by a predetermined degree or more is deleted. However, the configuration of the deletion unit is not limited thereto. The deletion unit may delete a feature point based on other criteria. For example, among the feature points in the target region, the feature point of which the number of times of collation is equal to or less than a predetermined value may be deleted. In the above embodiment, the size of the region including the route on which the subject vehicle 101 has traveled the predetermined number of times or more is determined, and when the size is the predetermined size or more, the region is determined as the target region. However, the target region may be determined based on whether or not the area of the region is equal to or larger than a predetermined size, or may be determined based on whether or not the length of the route included in the region and traveled by the subject vehicle 101 a predetermined number of times or more is equal to or larger than a predetermined value. Furthermore, in the above embodiment, the map generation apparatus 50 is applied to a self-driving vehicle, but the map generation apparatus 50 is also applicable to a vehicle other than the self-driving vehicle. For example, the map generation apparatus 50 can also be applied to a manual driving vehicle including advanced driver-assistance systems (ADAS).

The present invention also can be configured as a map generation method including: extracting one or more feature points from a detection data acquired by an in-vehicle detection unit detecting a situation around a subject vehicle in traveling; generating a map using the feature points extracted in the extracting while the subject vehicle is traveling; collating the feature points extracted in the extracting with the map to recognize a position of the subject vehicle on the map when the subject vehicle travels in a region corresponding to the map; deleting, from the map, a feature point whose result of collation in the recognizing is less than a predetermined degree among the feature points included in the map.

The above embodiment can be combined as desired with one or more of the above modifications. The modifications can also be combined with one another.

According to the present invention, it is possible to reduce the amount of map data.

Above, while the present invention has been described with reference to the preferred embodiments thereof, it will be understood, by those skilled in the art, that various changes and modifications may be made thereto without departing from the scope of the appended claims.

What is claimed is:

1. A vehicle control system comprising:
a camera configured to detect a situation around a subject vehicle in traveling; and
an actuator for traveling;
a microprocessor and a memory connected to the microprocessor, wherein
the microprocessor is configured to perform:
extracting one or more feature points from detection data acquired by the camera;
generating a map using the one or more feature points while the subject vehicle is traveling to store the map in the memory;
recognizing a position of the subject vehicle on the map when the subject vehicle travels in a region corresponding to the map by collating the one or more feature points with the map;
generating route information indicating a route on which the subject vehicle has traveled based on the position of the subject vehicle to store the route information in the memory;
determining a target region including the route, on which the subject vehicle has traveled a predetermined number of times or more and has a predetermined length or more, extracted from the map based on the route information;
counting a number of times which each feature point included in the map is collated with the one or more feature points extracted from the detection data while the subject vehicle is traveling in the target region to acquire the number of times as the result of the collating;
deleting, from the map, a feature point of which a result of the collating is less than a first predetermined degree among feature points corresponding to the target region;
generating a driving path for the subject vehicle based on the position of the subject vehicle and the situation around the subject vehicle detected by the camera; and
controlling the actuator so that the subject vehicle automatically travels along the driving path, wherein
the microprocessor is further configured to perform the deleting including calculating an average value of the number of times of the each feature point, and deleting a feature point of which the number of times is less than the average value by a second predetermined degree or more from the map.

2. The vehicle control system according to claim 1, wherein
the microprocessor is configured to perform
the deleting including deleting a feature point of which the number of times is equal to or less than a predetermined ratio of the average value.

3. The vehicle control system according to claim 2, wherein
the predetermined ratio is determined based on an accuracy required for the map.

4. The vehicle control system according to claim 2, wherein
the predetermined ratio is determined based on a number of times of traveling of the subject vehicle in the target region.

5. A vehicle control system comprising:
a camera configured to detect a situation around a subject vehicle in traveling;
an actuator for traveling; and
a microprocessor and a memory connected to the microprocessor, wherein the microprocessor is configured to perform as:
a feature point extraction unit configured to extract one or more feature points from detection data acquired by the camera;
a generation unit configured to generate a map using the one or more feature points while the subject vehicle is traveling to store the map in the memory;
a position recognition unit configured to collate the one or more feature points with the map to recognize a position of the subject vehicle on the map when the subject vehicle travels in a region corresponding to the map;
a route information generation unit configured to generate route information indicating a route on which the subject vehicle has traveled based on the position of the subject vehicle to store the route information in the memory;
a deletion unit configured to determine a target region including the route, on which the subject vehicle has traveled a predetermined number of times or more and has a predetermined length or more, extracted from the map based on the route information, and to delete, from the map, a feature point of which a result of collation by the position recognition unit is less than a first predetermined degree among feature points corresponding to the target region;
an action plan generation unit configured to generate a driving path for the subject vehicle based on the position of the subject vehicle and the situation around the subject vehicle detected by the camera; and
a driving control unit configured to control the actuator so that the subject vehicle automatically travels along the driving path, and wherein
the microprocessor is configured to further perform as a count unit configured to count a number of times which each feature point included in the map is collated by the position recognition unit with the one or more feature points extracted from the detection data while the subject vehicle is traveling in the target region to acquire the number of times as the result of collation; and the deletion unit calculates an average value of the number of times of the each feature point counted by the count unit, and deletes a feature point of which the number of times is less than the average value by a second predetermined degree or more from the map.

6. The vehicle control system according to claim 5, wherein
the deletion unit deletes a feature point of which the number of times is equal to or less than a predetermined ratio of the average value.

7. The vehicle control system according to claim 6, wherein
the predetermined ratio is determined based on an accuracy required for the map.

8. The vehicle control system according to claim 6, wherein
the predetermined ratio is determined based on a number of times of traveling of the subject vehicle in the target region.

9. A map generation method comprising:
extracting one or more feature points from detection data acquired by a camera detecting a situation around a subject vehicle in traveling;
generating a map using the one or more feature points while the subject vehicle is traveling to store the map in a memory;
collating the one or more feature points with the map to recognize a position of the subject vehicle on the map when the subject vehicle travels in a region corresponding to the map;
generating route information indicating a route on which the subject vehicle has traveled based on the position of the subject vehicle to store the route information in the memory;
determining a target region including the route, on which the subject vehicle has traveled a predetermined number of times or more and has a predetermined length or more, extracted from the map based on the route information;
counting a number of times which each feature point included in the map is collated with the one or more feature points extracted from the detection data while the subject vehicle is traveling in the target region to acquire the number of times as the result of the collating;
deleting, from the map, a feature point of which a result of the collating is less than a predetermined degree among feature points corresponding to the target region;
generating a driving path for the subject vehicle based on the position of the subject vehicle and the situation around the subject vehicle detected by the camera; and
controlling an actuator so that the subject vehicle automatically travels along the driving path, wherein
the deleting includes calculating an average value of the number of times of the each feature point, and deleting a feature point of which the number of times is less than the average value by a second predetermined degree or more from the map.

10. The method according to claim 9, wherein
the deleting includes deleting a feature point of which the number of times is equal to or less than a predetermined ratio of the average value.

11. The method according to claim 10, wherein
the predetermined ratio is determined based on an accuracy required for the map.

12. The method according to claim 10, wherein
the predetermined ratio is determined based on a number of times of traveling of the subject vehicle in the target region.

* * * * *